United States Patent
Kostenko et al.

(10) Patent No.: US 12,468,772 B2
(45) Date of Patent: Nov. 11, 2025

(54) COMMUNICATION SYSTEM AND METHOD FOR BROWSER EXTENSIONS

(71) Applicant: FISPAN Services Inc., Vancouver (CA)

(72) Inventors: Arsenii Kostenko, Coquitlam (CA); Florian Krauthan, Burnaby (CA)

(73) Assignee: FISPAN Services Inc., Vancouver (CA)

( * ) Notice: Subject to any disclaimer, the term of this patent is extended or adjusted under 35 U.S.C. 154(b) by 0 days.

(21) Appl. No.: 17/095,739

(22) Filed: Nov. 12, 2020

(65) Prior Publication Data

US 2021/0224829 A1 Jul. 22, 2021

Related U.S. Application Data

(60) Provisional application No. 62/934,266, filed on Nov. 12, 2019.

(51) Int. Cl.
| | |
|---|---|
| *G06F 16/957* | (2019.01) |
| *G06F 9/445* | (2018.01) |
| *G06F 16/955* | (2019.01) |
| *G06Q 10/0631* | (2023.01) |
| *G06Q 20/10* | (2012.01) |
| *G06Q 30/0601* | (2023.01) |
| *G06Q 40/02* | (2023.01) |
| *G06Q 40/12* | (2023.01) |

(52) U.S. Cl.
CPC ........ *G06F 16/957* (2019.01); *G06F 9/44526* (2013.01); *G06F 16/9566* (2019.01); *G06Q 10/0631* (2013.01); *G06Q 20/102* (2013.01); *G06Q 30/0613* (2013.01); *G06Q 40/02* (2013.01); *G06Q 40/12* (2013.12)

(58) Field of Classification Search
CPC .... G06F 9/542; G06F 16/954; G06F 16/9566; G06F 16/957; G06F 9/44526; G06Q 30/0201; G06Q 10/0631; G06Q 30/0613; G06Q 40/02; G06Q 40/12; G06Q 20/102
See application file for complete search history.

(56) References Cited

U.S. PATENT DOCUMENTS

| | | | |
|---|---|---|---|
| 6,289,382 B1 * | 9/2001 | Bowman-Amuah | ........................ G06F 13/387 709/226 |
| 8,392,288 B1 * | 3/2013 | Miller | .................... G06Q 30/06 705/26.81 |
| 8,769,432 B1 * | 7/2014 | Rhyne | .................. G06Q 20/102 715/789 |
| 9,021,468 B1 | 4/2015 | Pizano et al. | |
| 9,342,386 B1 * | 5/2016 | Sargent | ................. G06F 16/986 |

(Continued)

OTHER PUBLICATIONS

Kagan et al. Financial Technology (Fintech) Definition, web article updated on Aug. 27, 2020 retrieved from [https://www.investopedia.com/terms/f/fintech.asp] on [Dec. 28, 2021], 13 pages. (Year: 2020).*

(Continued)

*Primary Examiner* — Nicholas Ulrich
(74) *Attorney, Agent, or Firm* — Norton Rose Fulbright Canada LLP; Maya Medeiros (57) ABSTRACT

A browser extension that determines whether the URL, title or content of the current browser tab corresponds to financial or accounting matters and, if so, provides operations pertaining thereto from within the same browser tab.

19 Claims, 8 Drawing Sheets

(56) References Cited

U.S. PATENT DOCUMENTS

| | | | |
|---|---|---|---|
| 11,087,348 B2* | 8/2021 | Henderson | G06Q 30/0222 |
| 2009/0164395 A1* | 6/2009 | Heck | G06F 16/954 |
| | | | 706/16 |
| 2014/0157110 A1* | 6/2014 | Abbott, Jr. | G06Q 40/12 |
| | | | 715/234 |
| 2017/0070484 A1* | 3/2017 | Kruse | H04L 9/14 |
| 2017/0132624 A1* | 5/2017 | Muchang | G06Q 20/4014 |
| 2017/0140285 A1* | 5/2017 | Dotan-Cohen | G06Q 10/04 |
| 2017/0186027 A1* | 6/2017 | Hudson | G06Q 30/0239 |
| 2017/0256003 A1* | 9/2017 | Isaacson | G06Q 20/12 |
| 2019/0243883 A1* | 8/2019 | Vangen | G06F 16/9577 |
| 2020/0204515 A1* | 6/2020 | Zhou | H04L 67/025 |
| 2021/0286857 A1* | 9/2021 | Guillon | G06F 16/9577 |

OTHER PUBLICATIONS

Microsoft Computer Dictionary. Published by Microsoft Press © 2002. Excerpted p. 412 with definitions for pop-up help, pop-up menu, pop-up messages, and pop-up window. (Year: 2002).*

FI.SPAN web site [http://www.fispan.com], publically available on Sep. 25, 2018 retrieved via Internet Archive on [Dec. 28, 2021]. 3 pages. (Year: 2018).*

FISPAN Demo at Finovate Europe 2017. Web page entry posted on Apr. 11, 2017 which includes video link [https://youtu.be/f8R5Zq6u2HI]. Retrieved from [https://fispan.com/resource/fispan-finovate-europe-2017/] on [Dec. 28, 2021]. 4 pages. (Year: 2017).*

* cited by examiner

FIG. 1

Extension Setup

COMMUNICATION SYSTEM AND METHOD FOR BROWSER EXTENSIONS

BACKGROUND OF THE INVENTION

1. Field of the Invention

The present invention relates to a computer method and system for providing context relevant finance and accounting operations via a browser extension.

2. Description of the Related Art

There are a number of vendors who provide accounting and resource planning software that manages business processes and integrates a company's financials, supply chain, operations, reporting, manufacturing, and human resources. The vast majority of these systems typically cover fundamental actions such as creating records in a ledger and managing the records of vendors and customers. However, they do not encompass the entire spectrum of operations users need to run their businesses.

As a result, it is common for users to utilize multiple, disparate web-based applications to fulfill different requirements related to their business processes. For instance, they may have to use an accounting app to document payment to a vendor, and a separate banking app to carry out the actual money transfer. Later on, the users may have to use yet another app for cash flow forecasting and other analytical work.

Three major problems exist under these conditions:
1. From an end-user perspective, this is a complicated and fragmented landscape of incomplete solutions that produce inefficient, costly and lengthy workflows, and a suboptimal overall experience.
2. From a service provider point of view, the vast diversity of accounting, ERP and banking systems makes it incredibly challenging, time-consuming and expensive to serve all user groups. ERP and accounting systems vendors face the same challenges while attempting to integrate with many banking, analytics and other solution providers.
3. Data exchange between the apps frequently endures incompatible formats, inaccuracies and mistakes, opaqueness and delays.

What others have done and why have they failed
The four main actors in this field are:
Corporate users
Banks, credit unions and other service providers
ERP and accounting system vendors
Third-party solution providers and integrators
Historically, different players have attempted to solve these problems differently.

Banks to ERPs

Service providers have attempted to build deep integrations with ERP and accounting systems in the form of plugins and extensions. This approach is inherently flawed, because the majority of ERP and accounting system vendors do not provide means to (and in some cases even forbid) any user interface customization or alteration of their products.

To integrate with those who do provide with customization capabilities like API or plugin/extension interfaces would require many years of development and unreasonable budgets—making no economic sense to pursue.

Another obstacle is that ERP vendors generally view this as direct competition from service providers and are not interested in cooperation. Furthermore, banks and service providers often do not perceive the necessity of converging banking and accounting experiences in the first place.

ERPs to Banks

ERP and accounting system vendors have attempted partnerships with service providers to extend the functionality of their products to cover more business scenarios. However, they have faced the same underlying problem as the service providers who tried to integrate with ERPs—the number of banks to integrate with is simply unmanageable. Similarly, ERP vendors lack cooperation from banks for compliance and perceived competition reasons.

Fintechs as Solution Providers

Some entrepreneurs have recognized the market opportunity, and have attempted to converge various aspects of banking, accounting, resource planning and HR in niche apps suitable only for narrow audiences. The resulting implementations vary in completeness and delivery mechanism—via plugins or separate apps, which are effectively just as susceptible to the same issues outlined earlier.

Often, banks and service providers regard fintechs as direct competition and are unwilling to cooperate with them, which slows down the speed of innovation on both sides.

End-Users to Banks and ERPs

Lastly, end-users themselves frequently decide to develop their specific solutions through the involvement of external contractors or internal IT teams. This path is the least scalable and is cost-inefficient, as it effectively creates a solution provider sub-entity within the parent organization consuming substantial resources and creating operational complexity that affects the primary business of the organization. When the parent organization outgrows its current ERP or service provider, it will require a complete rebuild of the same solution for the new ERP or service provider of choice.

Common Impediments

Apart from the apparent concerns of economic viability, lengthy delivery timelines and lack of scalability, one of the most significant obstacles for all of the methods described above is the misalignment of legal and compliance frameworks and baselines for the various parties involved. For instance, banks typically impose the strictest legal and compliance requirements while fintechs will often have looser restrictions, partly due to the fact that they are not subject to rigorous governmental regulation. On the other hand, corporate legal and compliance frameworks will evolve and mature along with their corporate embodiments.

Given that the most basic host-to-host integration scenario involves at least three parties—the corporate, the bank and the ERP vendor—all parties must adhere to the most rigorous framework among the three (the bank). Levelling up corporate compliance to bank level often becomes the barrier that corporates and fintechs cannot overcome, and what immediately terminates the whole effort.

SUMMARY OF THE INVENTION

The present invention provides the method and system for extending the functionality of web-based ERP and accounting systems that:
1. Allow building a single solution that applies to virtually any web-based ERP or accounting system as well as third party service providers or websites without alterations, as opposed to building multiple solutions—one solution per ERP or accounting system.

2. Infer end-user intentions from the URL and the current page content to present contextually relevant interfaces, operations and functionality.
3. Provide real-time actionable notifications when a user action is required or possible.
4. Maintain data privacy and security of information flows through host-host-host data exchange between the ERP provider, the platform provider, and the bank.

Other aspects of the solution that complement the present invention but are not inherent to it are covered below.

Compliance

The applicant holds certifications which meet the highest level of industry standards that allow the applicant to work with banks.

Data Exchange

The platform of the present invention normalizes incompatible data formats to a unified API and data model.

Connectivity to Banks and Service Providers

The present solution does not require service providers, ERP vendors and corporate entities to establish a data exchange between each other—this responsibility is entrusted to an organization such as applicant's, which establishes secure data exchange channels among all parties.

The core object of invention is to create a browser extension that reads the information available in the browser (such as the URL, page title or/and page content) to determine the financial or/and accounting context and provides access to relevant financial or/and accounting operations from within the same browser tab where the context is present.

DETAILED DESCRIPTION OF THE INVENTION

Background on Web Extensions

The solution is implemented as a standard browser extension. Essentially, a browser extension is a small software program which can alter or enhance functionality on a webpage. Some examples of features made possible by browser extensions on the market today include ad blocking (Adblock Plus, uBlock Origin), password management (Lastpass, Keepass), and online shopping discounts (Honey, Swagbucks). These extensions are programmed using coding languages such as JavaScript for the functionality, and HTML (HyperText Markup Language) and CSS (Cascading Style Sheets) for the appearance of the user interface. Some examples of extensions are available at (chrome.google.com/webstore/category/collection/editors_picks extensions).

Browser extensions are used in order to fulfill a single purpose for the user. They can have as many features and functionality as they want, so long as it ultimately reaches the extension's goal. For example, an ad blocker browser extension can have multiple functions such as letting users customize which ads they want to see, which ones they don't, certain websites that will always have ads blocked, etc. As long as the extension blocks ads, it's fulfilling its purpose as a browser extension to enhance the end-user's experience when browsing the web.

While browser extensions are similar in some ways to other types of applications such as desktop apps, mobile apps, and webpages, only browser extensions allow for extending the functionality of a webpage without the need to navigate to a 3rd-party webpage, desktop app, or mobile app. (see: What are extensions? developer.mozilla.org/en-US/docs/Mozilla/Add-ons/WebExtensions/What are WebExtensions). See also U.S. Pat. Nos. 9,021,468 and 8,527,881 for example of different extension patents in use today.

Figure 1:
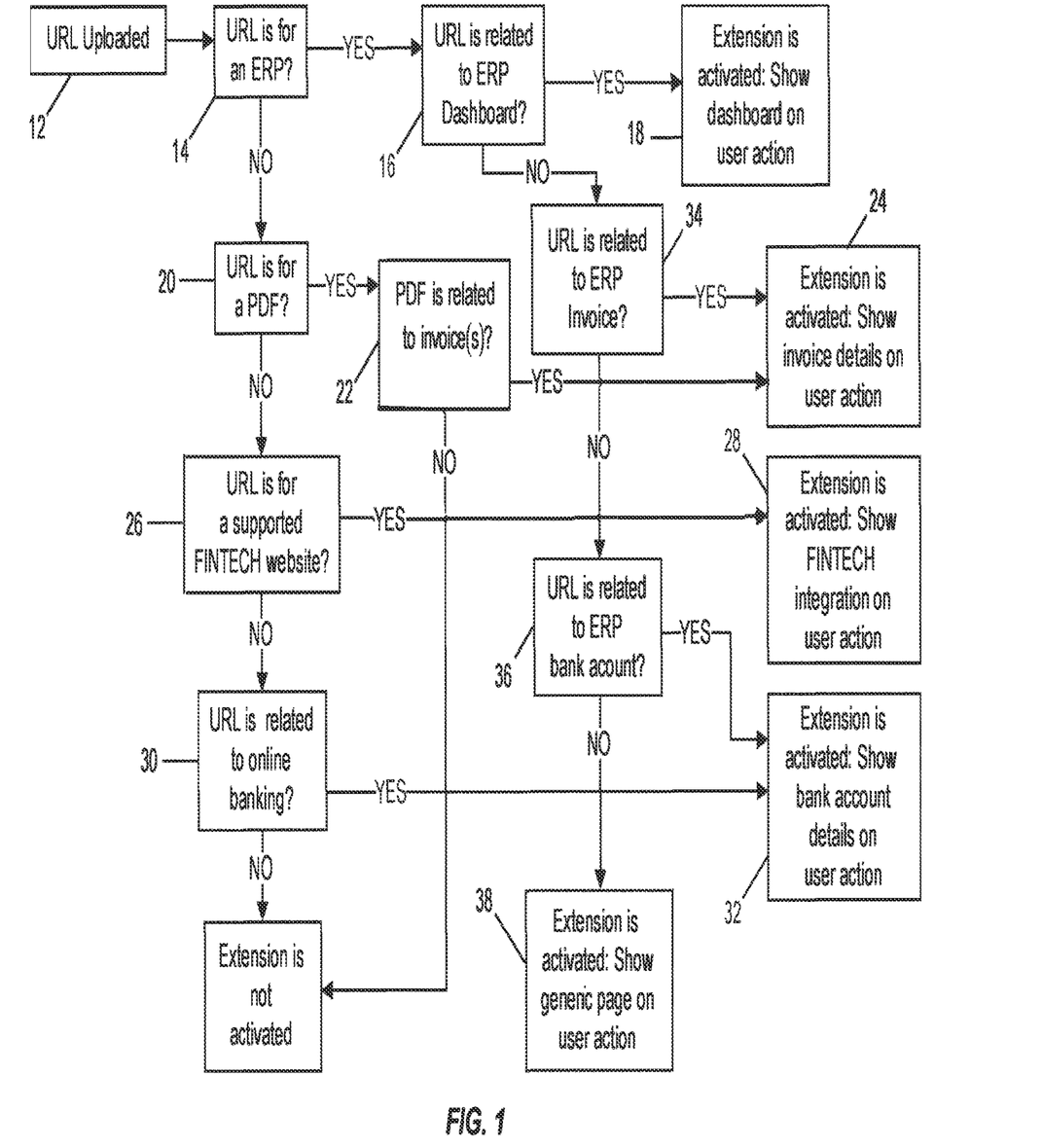
FIG. 1 is a flowchart for activating and opening a browser extension.

Turning first to FIG. 1, there is illustrated a flow chart for an example of activating the browser extension (this decision tree is non exhaustive and can/will be expanded onto more cases). The browser sends a message to the extension as soon as a new page is loaded 12. A first decision point 14 determines if the loaded page is an ERP. If "yes", a next decision point 16 to determine if the URL is of the ERP dashboard. If "yes", the next decision point 18 activates the browser extension and displays the dashboard as soon as the user clicks on the extension (not shown in this diagram).

If the first decision point 14 is "no", another decision point 20 determines if the URL is of a pdf file. If "yes", a next decision point 22 determines if the pdf file is related to invoices (using content pattern matching). If "yes" a module 24 activates the extension and on user activation (through click on the extension) displays invoice details and awaits user action. If the message does not include a pdf file, another decision point 26 determines if the message is from a supported fintech website. If "yes, a activation of the extension through the user displays the finance/accounting associated information and/or operations for user action.

If it is determined in decision point 26 that the opened URL is not of a fintech site, then a next decision point 30 determines if the page is related to online banking. If "yes", a module 32 activates the extension and on user click displays bank account details. If not related to banking, no further action is taken.

If, at the decision module 16, the answer is "no", the determination is made in another decision module 34 if the communication is related to an ERP invoice, If "yes", the module 24 is accessed and the browser extension is activated. If "no", another decision point 36. determines if the communication is related to an ERP bank account If "yes", module 32 is accessed. If "no", a module 38 is accessed, activating the extension is activated displaying a generic page.

Extension Setup

Figure 2:
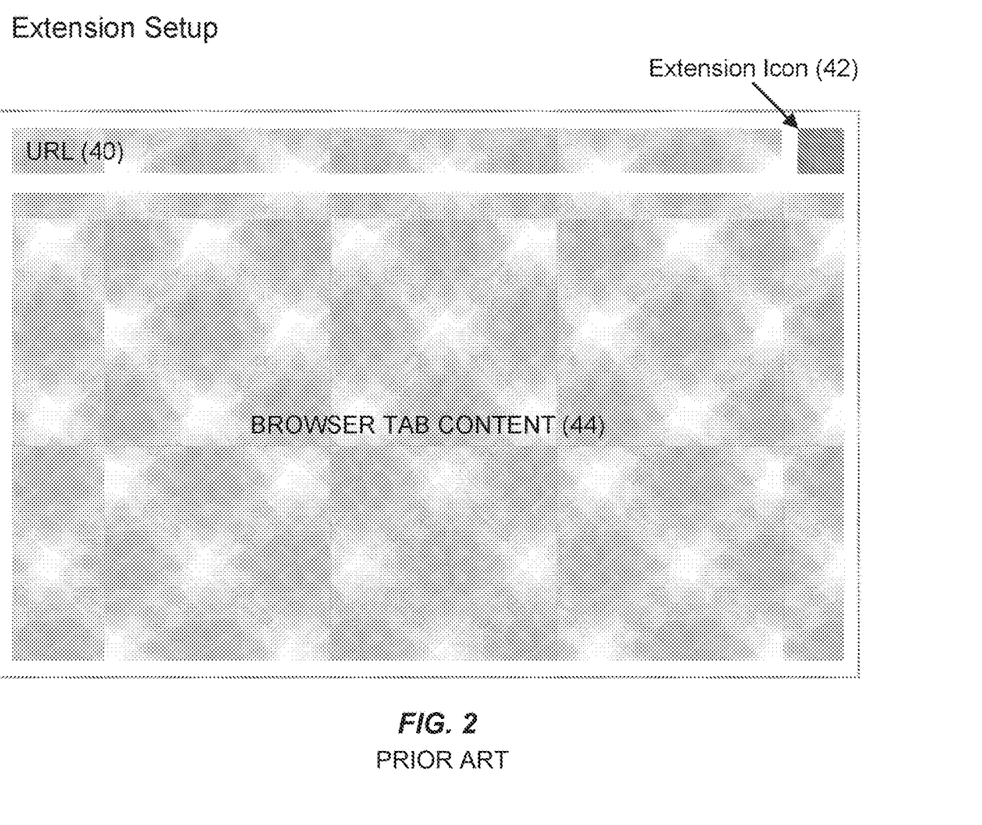
FIG. 2 is a diagram of a typical extension setup.

As a first step, the end-user installs a supplied extension into their browser by the standard methods provided in the web-browser, e.g. Chrome, Firefox, Safari, Opera, Edge. A diagram of a typical extension setup is shown in FIG. 2 which shows a URL 40 in the address bar, an extension icon 42 next to the address bar, and the browser tab content 44.

Usually this is done by navigating to the respective browser's app store, searching for the desired extension (in this example, Applicant's extension), then clicking on the install button. Installation of the extension may also be done by downloading the extension file and then providing the file to the browser. The user must agree to the extension's permissions to install it, which include webpage access to supported ERPs and the particular platform. After that, a notification is displayed by the browser indicating the successful installation of the extension, and in certain browsers the icon representing the selected extension appears in the address bar of the browser (3).

Figure 3:
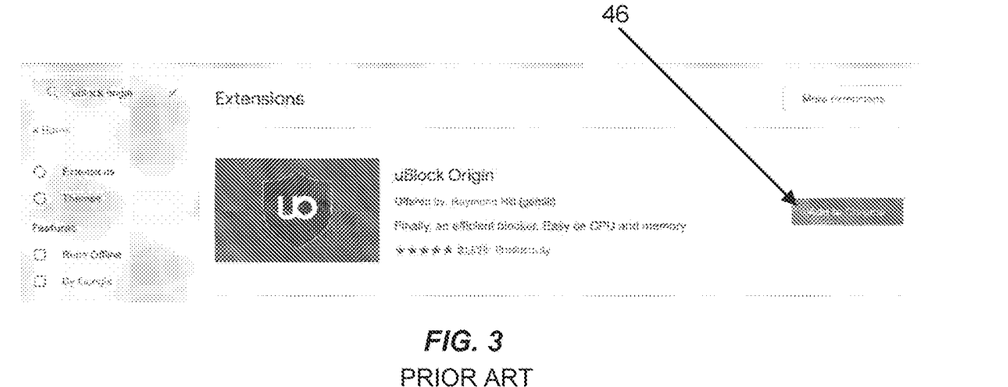
FIG. 3 is a first snippet from a Chrome extension called uBlock Origin.
Figure 4:
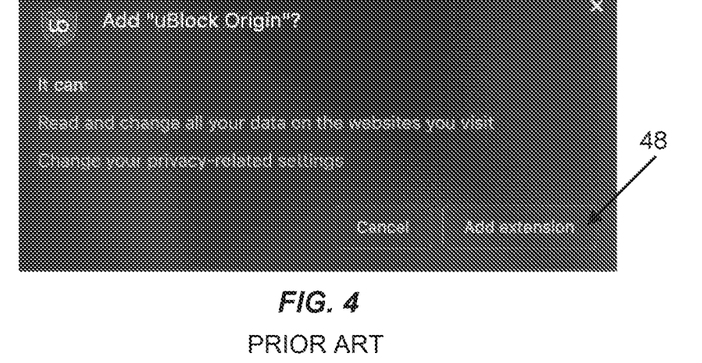
FIG. 4 is a second snippet from a Chrome extension called uBlock Origin.

An example of searching for and installing a Chrome extension called uBlock Origin is shown in FIGS. 3 and 4. In the below case, the user would click on the "Add to Chrome" button 46 in the first screenshot, FIG. 3, which will pop up a dialog as shown in the second screenshot, FIG. 4. The user would then click on "Add Extension" 48 to add the extension.

Figure 5:
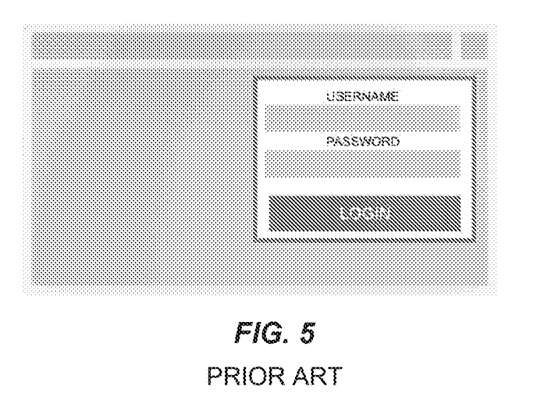
FIG. 5 is a diagram of authentication through Password Grant.
Figure 6:
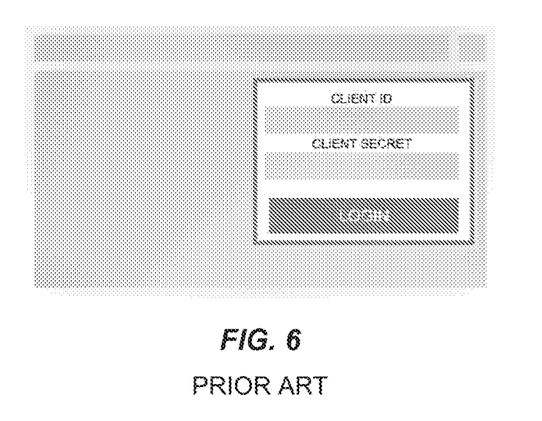
FIG. 6 is a diagram of authentication through Client Credentials Grant.

The authentication of the end-user is done through the standard OAuth 2.0 Password Grant (oauth.net/2/grant-types/password/) on the first click on the extension icon or OAuth 2.0 Client Credentials Grant (oauth.net/2/grant-types/client-credentials/) at the extension configuration stage. An example of authentication through Password Grant and Client Credentials Grant respectively is shown in FIGS. 5 and 6.

Activating & Opening the Extension

Figure 7:
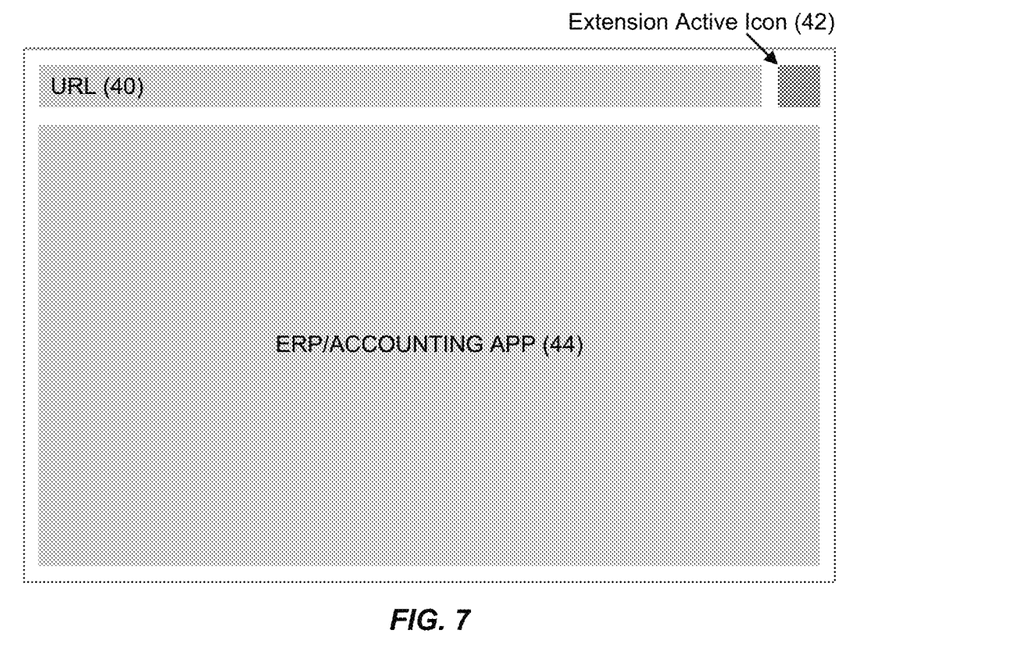
FIG. 7 is a diagram of a typical extension setup where an extension icon indicates that the extension has been activated in response to an ERP or accounting app.

The extension becomes activated as soon as the hostname part of the URL (40) of the active browser tab is recognized by the extension as corresponding to any ERP or accounting system specified. The activation of the extension is shown to the end-user, depending on the browser, by either the button changing colors or the appearance of the extension icon 42 in the address bar. FIG. 7 shows in diagram form an extension icon 42 that has been activated.

The extension can also be configured to activate if the content of the active browser tab (44) is recognized by the selected platform as actionable from the provider's services point of view. For example, a web page outside of an accounting or ERP system displaying a list of ledger records, bank accounts, or payment methods from a provider's contextual banking point of view is sufficient to present relevant contextual operations such as: checking bills status, displaying account balances served directly from the bank backend, etc. Examples of non-ERP pages where the extension could activate include online banking websites, FinTech websites, and PDF invoices.

An example of an algorithm that determines if the extension will be activated is displayed in FIG. 1. Note that the illustration shown is vastly simplified, and does not show every possible path that the extension may take to determine if it can activate.

Figure 8:
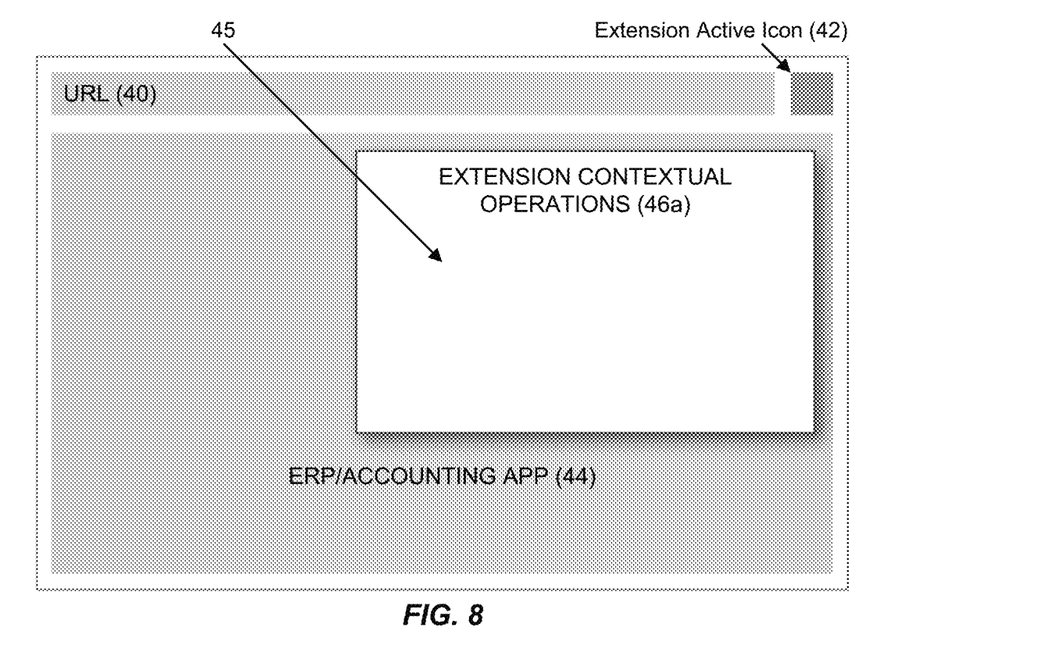
FIG. 8 is a diagram of a typical extension setup where an extension icon indicates that the extension has been activated in response to an ERP or accounting app and a dialog popup is presented.

Clicking the icon (42) will display a popup 45 dialog with the operations 46a, functionality and data relevant to the context of the active browser tab content 44 as shown in FIG. 8. The operations and functionality that are available on the current page are determined by the browser extension, and the data that is displayed is retrieved from the provider's platform through API calls. FIG. 8 shows a diagram of an extension setup where the extension activated, the user opened it, and a popup 45 dialog has been presented with available operations.

Figure 9:
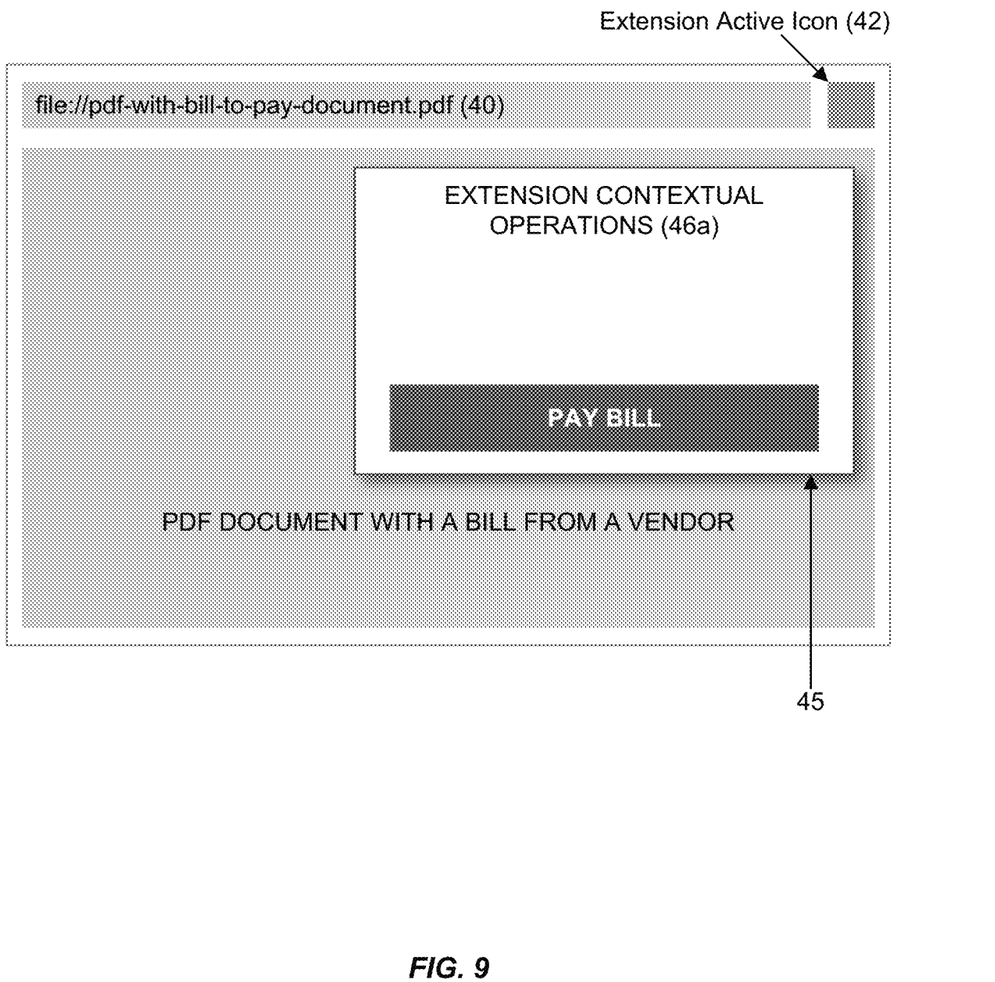
FIG. 9 is a diagram of a typical extension setup where an extension icon indicates that the extension has been activated in response to a PDF and a dialog popup is presented.

FIG. 9 shows a diagram of an extension setup where the extension activated, the user opened it, and a popup 45 dialog has been presented with an operation 46a to pay the bill corresponding to the PDF identified by the indicated URL 40. FIG. 9 is an example of the provision of contextually relevant operations to a user when the active tab of the browser is not an ERP or accounting app, but a PDF document of an open bill received from a vendor by email.

Using the Extension & Examples

Figure 10:
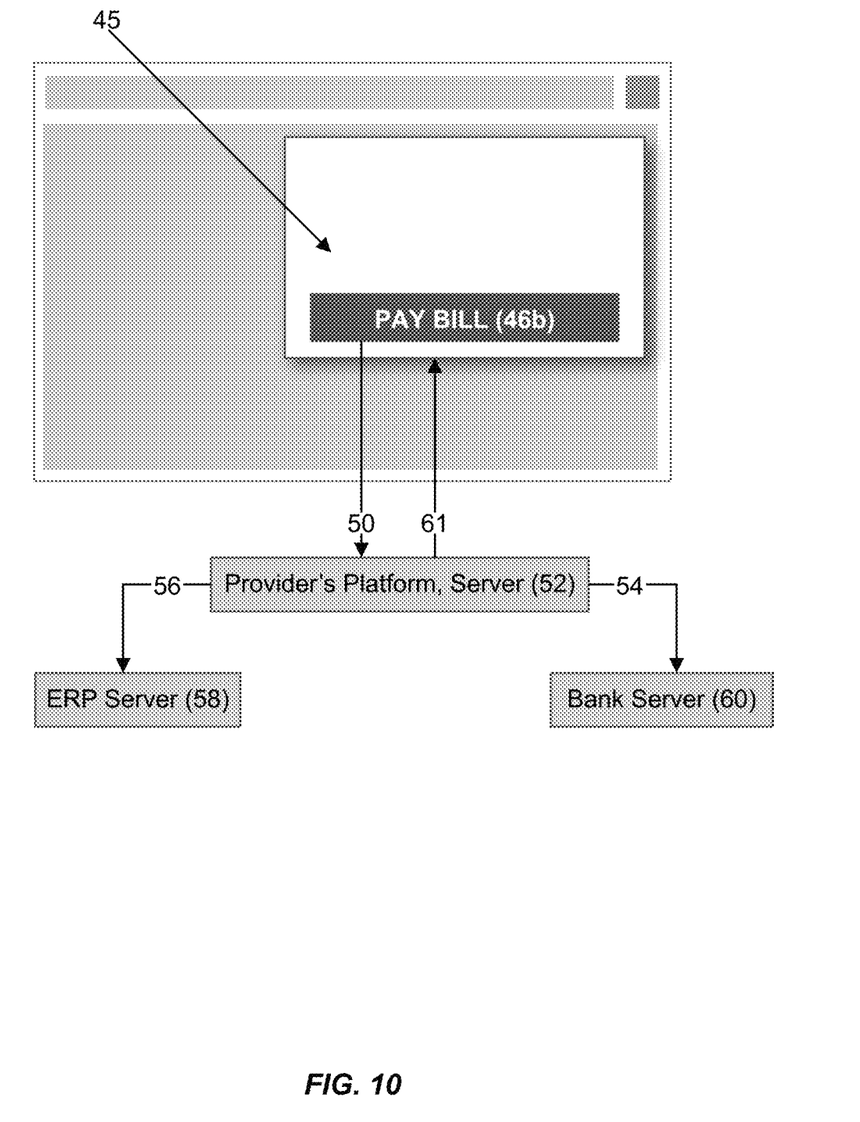
FIG. 10 is a block diagram showing typical connections among a user's browser, a fintech server, an ERP server, and a bank server.

When the end-user activates a contextual operation (46b), FIG. 10, a request that includes relevant data to carry out the contextual operation 46b is securely transmitted 50 via an encrypted channel to the service provider's server 52. The user may need to input or select data before the request is sent to the provider's platform or server 52. The platform or server 52 then takes care of executing the requested contextual operation 46b by doing the necessary data exchanges (54, 56) between all hosts' servers (58, 60) involved in the operation 46b. Possible hosts that may be involved in the operation 46b include the provider's platform, ERPs, banks, and FinTech services. The final result of the operation 46b gets securely transmitted back 61 to the end-user.

Figure 11:
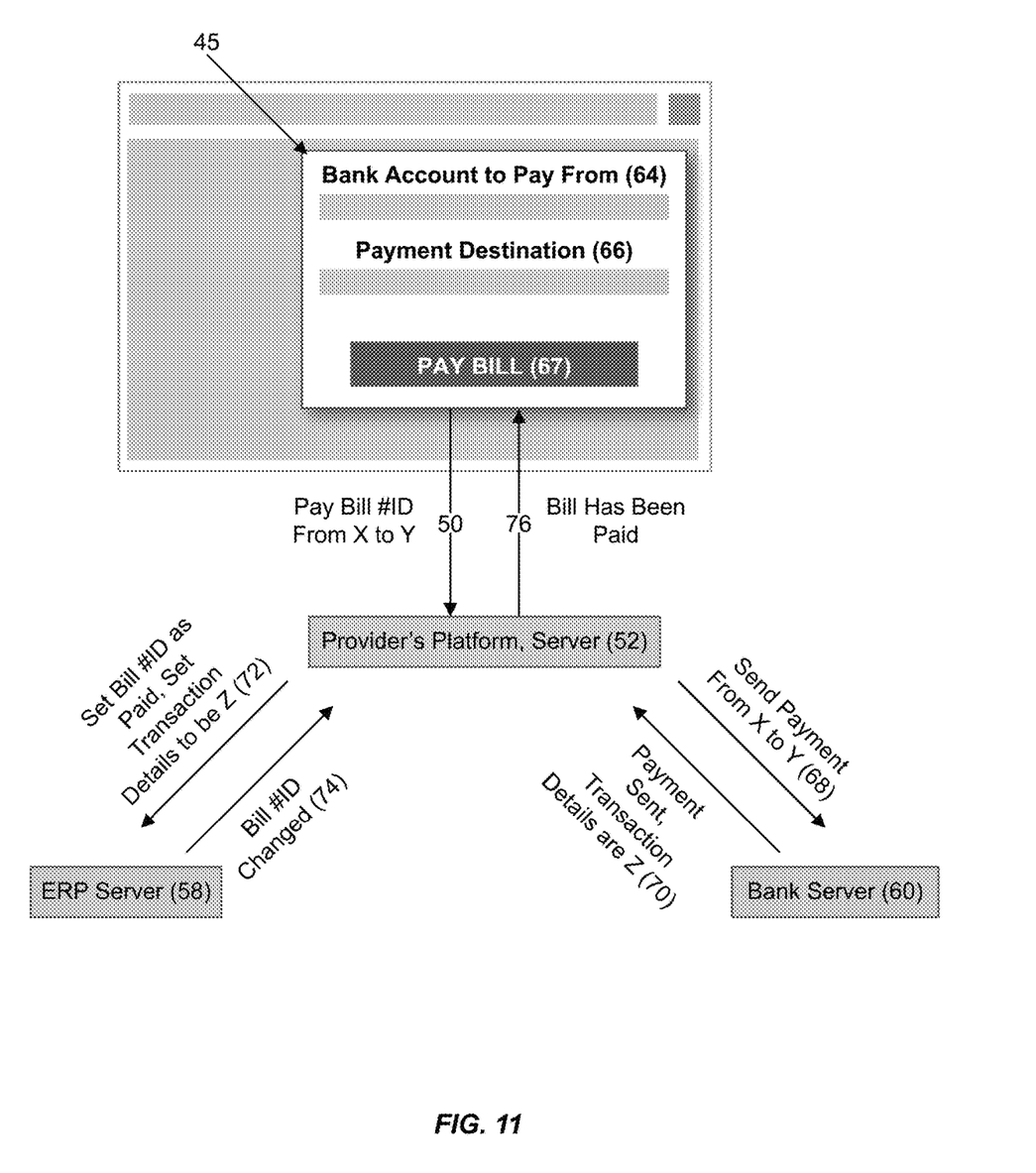
FIG. 11 is a block diagram showing the flow of information among a user's browser, a fintech server, an ERP server, and a bank server.

For example, in the case of a bill payment, the user would first select the bank account from which they want to pay the bill 64, and the destination of the payment 66, FIG. 11. Once the end-user submits the form 67, a request is transmitted to the provider's platform 52 with an instruction to pay the bill with relevant data that the platform requires to pay a bill (for example, the bill ID, the amount to be paid, the bank account from which to pay the bill, and the vendor's payment information) 50. The platform would then first send a payment request to the bank 68 with the source (end-users bank account) and destination (vendor's payment method). Once the bank has replied with the transaction details 70, the platform then creates and/or updates the bill on the ERP 72 to mark the bill as paid and include the transaction details (when supported by the ERP). Assuming the data exchanges with the hosts (68, 70, 72, 74) have succeeded, then a success message is then returned 76 to the end-user. In the case of an error when communicating with either the bank or ERP, the error details are then returned to the user.

The types of servers contacted and types of data transferred can differ between different contextual actions. For example, getting bank transactions would only cause communication between the client and the provider's platform, and between the provider's platform and the bank. Some contextual actions might only require communication with the ERP, and some actions might require no data transfer with external parties.

Figure 12:
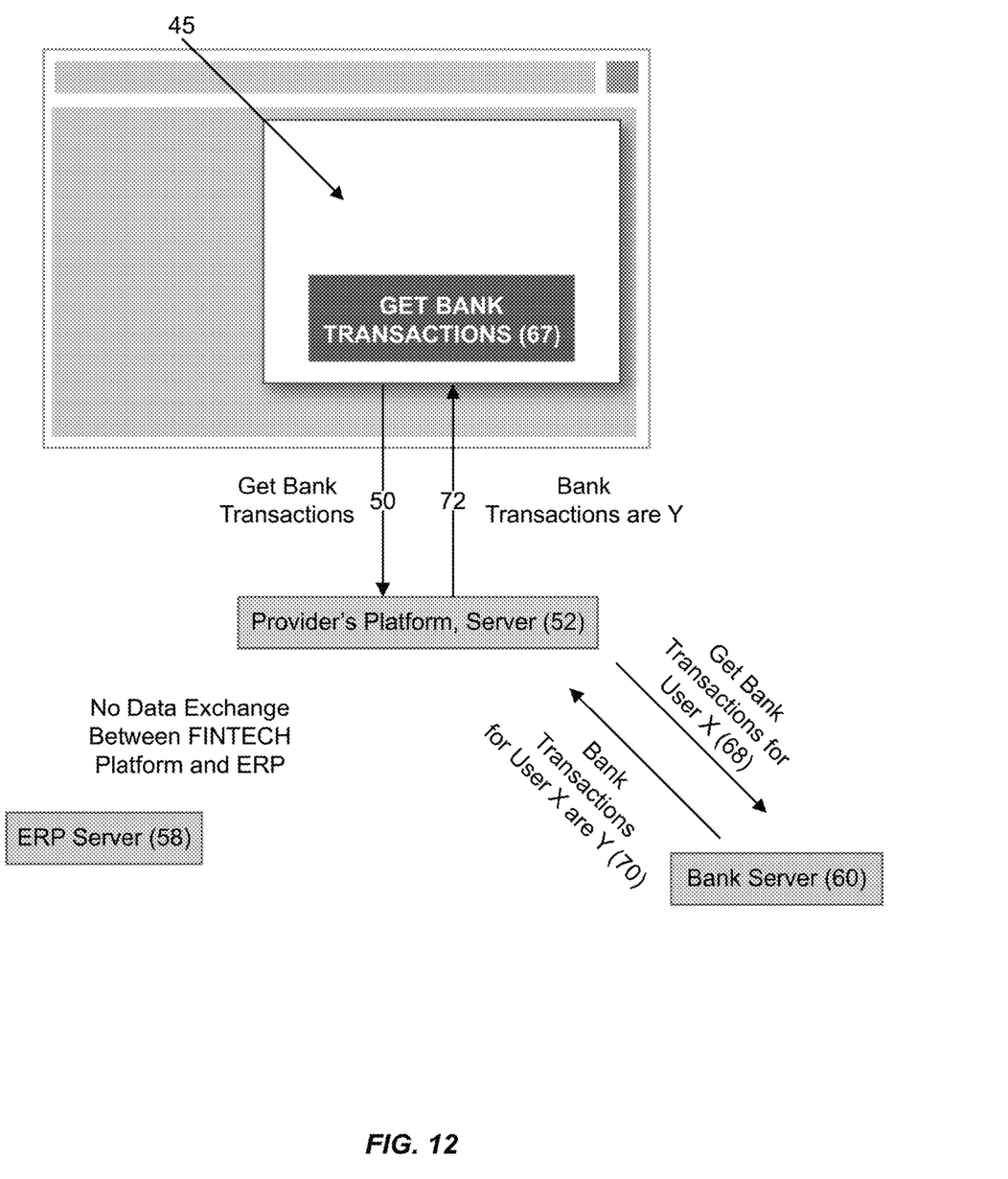
FIG. 12 is a block diagram showing the flow of information among a user's browser, a fintech server, and a bank server for purposes of providing bank transaction information.

An example illustration that shows a contextual action that only causes data transfer between the provider's platform and bank is shown in FIG. 12.

The invention disclosed herein is not limited to the specific embodiments described herein. The disclosed embodiments may be modified or have elements deleted or added while still remaining within the scope of this invention.

The invention is described herein by way of example only and is not limited to the disclosed example(s) or embodiment(s).

Similarly, the figures are provided as examples of the invention and to aid in understanding the invention and not to act as a limitation on the scope of the invention. Each limitation is expressly defined as not being limited to what is shown in the figures. The embodiments disclosed herein may be modified by those skilled in the art without departing from the scope of the invention.

The invention claimed is:

1. A method for a web browser extension to extend the functionality of a web-based enterprise resource provider, an accounting system, or supported website, the method comprising:
    activating a web browser extension upon (i) connection to a host name uniform resource locator and determining that the host name reveals a sender whose identity is stored in a database, or (ii) determining that presentation of data available in a browser corresponds to one or more accounting systems or enterprise resource providers, wherein the extension reads information in the browser, wherein the information comprises one or more of a uniform resource locator, a current page title, current page content, and Portable Document Format (PDF) files;
    upon activation of the extension, trigger opening of communication links with one or more servers to display information for a supported website or an enterprise resource provider dashboard or software menus, and, within the browser, present contextually relevant interfaces, operations and functionality comprising at least an operation for payment of a bill based on the information in the browser comprising the one or more of the uniform resource locator, the current page title, the current page content, and the PDF files;
    indicating activation of the web browser extension by changing an appearance of an icon or buttons of the extension;
    receiving activation of the operation for payment of the bill, and securely transmitting a request that includes data to carry out the operation for payment of the bill, wherein the data comprises a bill identifier, a payment amount, an account from which to pay the bill, and vendor payment information.

2. The method of claim 1, further comprising the extension inferring end-user intentions from the host name uniform resource locator and a current page content to present the contextually relevant interfaces, operations and functionality.

3. The method of claim 1, further comprising determining whether an operation or item of information is available in connection with the uniform resource locator, the current page title, and the current page content.

4. The method of claim 3, further comprising determining that the uniform resource locator, the current page title or the current page content relates to financial or accounting matters.

5. The method of claim 1, further comprising activating the web browser extension upon determining that a PDF file relates to an invoice or bill, and displaying details of the invoice or bill and available operations.

6. The method of claim 5, further comprising reading information from the invoice or bill comprising the bill identifier, the payment amount, an account, and the vendor payment information.

7. The method of claim 5, wherein the available operations comprise an operation for payment of the invoice or bill from a selected account to a destination for the payment.

8. The method of claim 1 further comprising transmitting the result of the operation for payment of the bill.

9. The method of claim 1 wherein the data of the request comprises a bill identifier, an amount to be paid, a source account from which to pay the bill, and vendor payment information.

10. The method of claim 1 wherein the contextually relevant interfaces, operations and functionality comprise an operation for checking bill status and an operation for displaying an account balance.

11. The method of claim 1 further comprising executing the operation for payment of the bill by securely exchanging data between servers involved in the operation for payment of the bill.

12. The method of claim 11 further comprising: transmitting a payment request to a bank server with the account from which to pay the bill and the vendor payment information, upon receiving a reply from the bank server with transaction details, transmitting an update indicating the bill as paid and the transaction details to an ERP server, and transmitting a success message to an end-user device.

13. A method for activating a web browser extension to extend the functionality of a web-based enterprise resource provider, an accounting system or supported website, the method comprising:
    activating a web browser extension upon (i) connection to a host name uniform resource locator and determining that the host name reveals a sender whose identity is stored in a database, or (ii) determining that the host name corresponds to one or more accounting systems or enterprise resource providers, wherein the extension reads information in a browser, wherein the information comprises one or more of a uniform resource locator, a current page title, current page content, and Portable Document Format (PDF) files,
    trigger opening of communication links with one or more servers to display information for a supported website or an enterprise resource provider dashboard or software menus, and presenting contextually relevant interfaces, operations and functionality comprising at least an operation for payment of a bill within the browser;
    indicating activation of the web browser extension by changing visual appearance of an icon or buttons of the web browser extension;
    receiving activation of the operation for payment of the bill, and securely transmitting a request that includes data to carry out the operation for payment of the bill, wherein the data comprises a bill identifier, a payment amount, an account from which to pay the bill, and vendor payment information.

14. The method of claim 13, further comprising inferring end-user intentions from the host name resource locator and a current page content to present the contextually relevant interfaces, operations and functionality.

15. The method of claim 13, further comprising determining whether an operation or item of information is available in connection with the uniform resource locator, the current page title, and the current page content.

16. The method of claim 15, further comprising determining that the uniform resource locator, the current page title or the current page content relates to financial or accounting matters.

17. The method of claim 13, further comprising activating the web browser extension upon determining that a PDF file relates to an invoice or bill, and wherein activation of the extension displays details of the invoice or bill and available operations.

18. The method of claim 17, further comprising reading information from the invoice or bill comprising the bill identifier, the payment amount, an account, and the vendor payment information.

19. The method of claim 17, wherein the available operations comprise an operation for payment of the invoice or bill from a selected account to a destination for the payment.

* * * * *